F. ARMSTRONG.
DENTAL APPARATUS.
APPLICATION FILED FEB. 8, 1907.
902,463.
Patented Oct. 27, 1908.
3 SHEETS—SHEET 3.
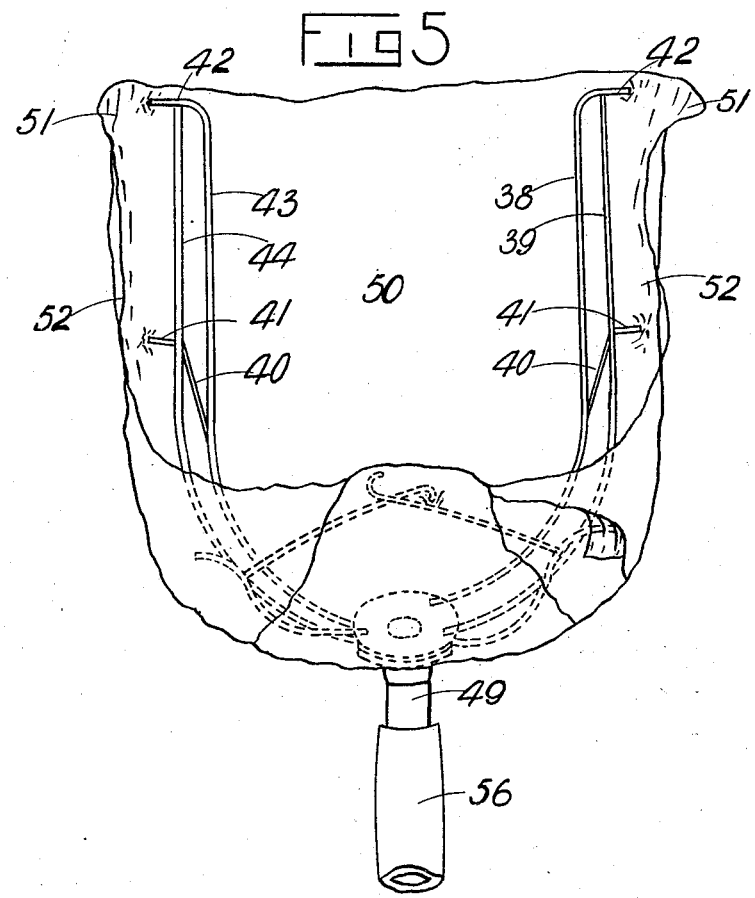
WITNESSES
INVENTOR
Frank Armstrong
ATTY

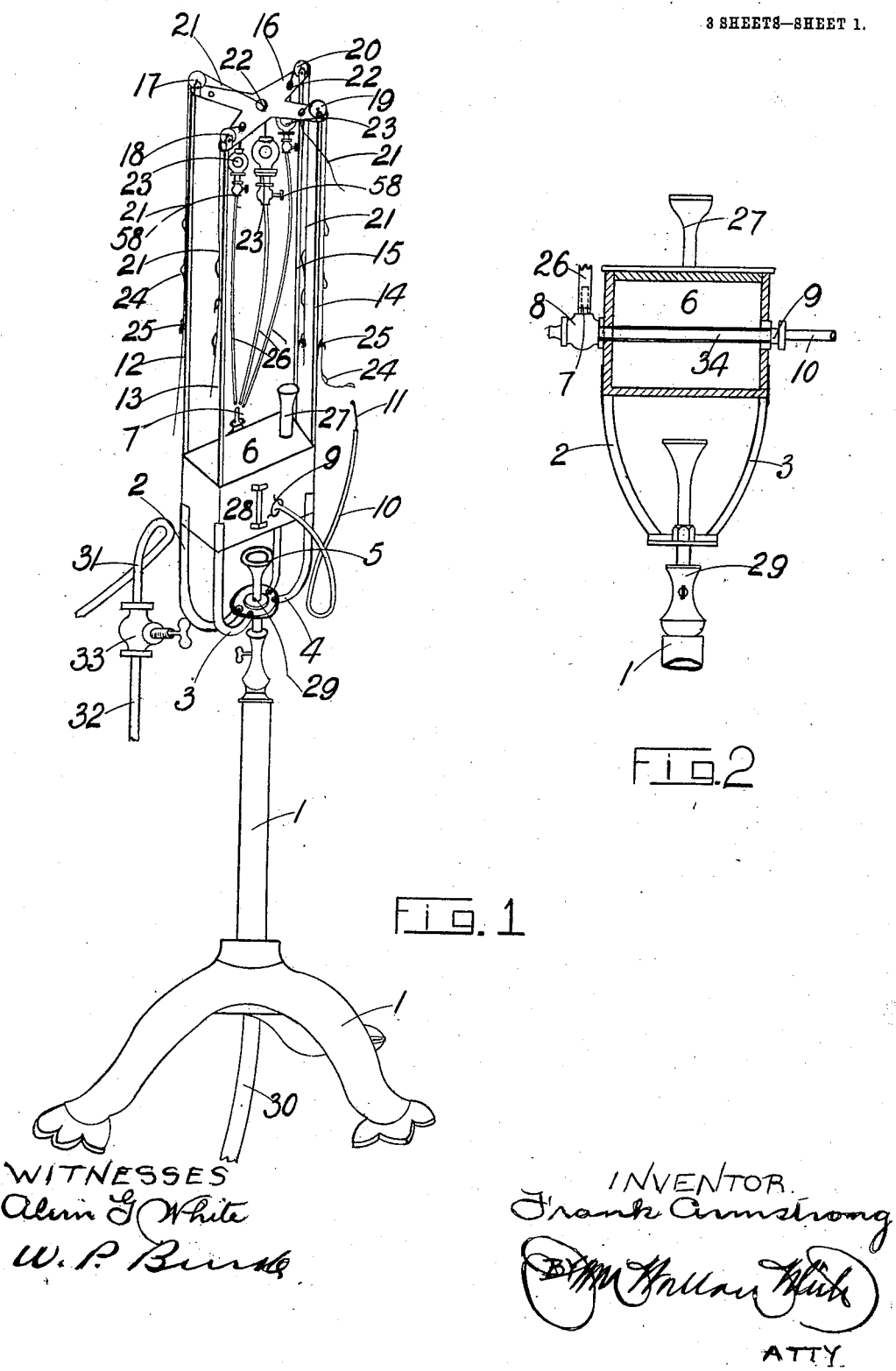

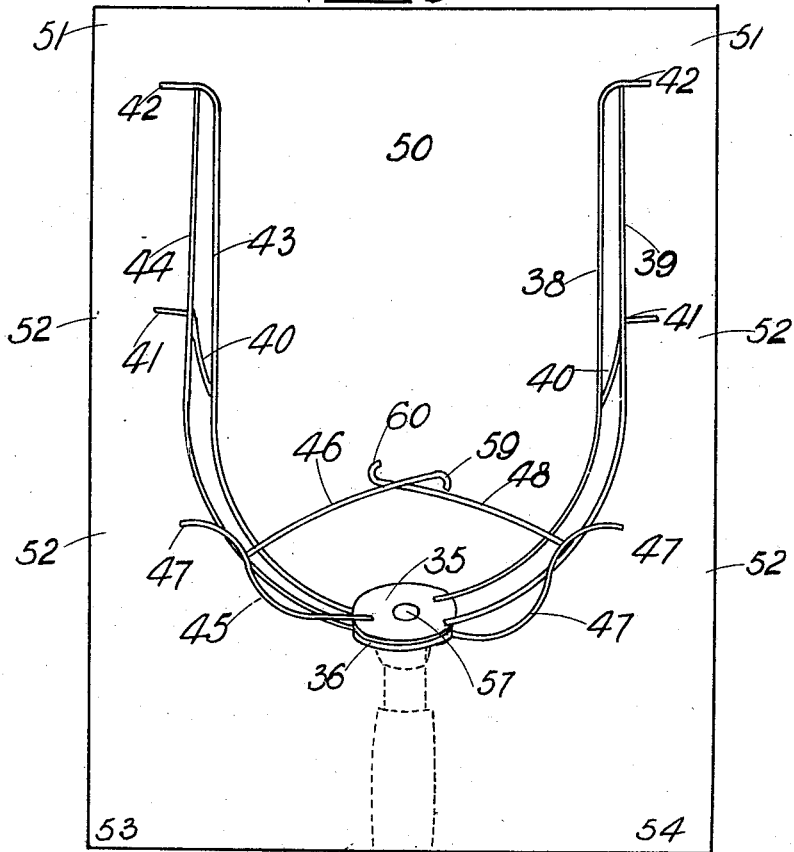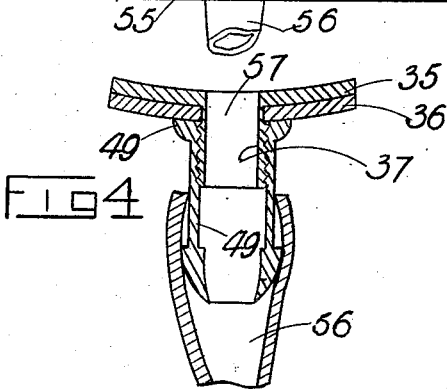

UNITED STATES PATENT OFFICE.

FRANK ARMSTRONG, OF DUNEDIN, NEW ZEALAND.

DENTAL APPARATUS.

No. 902,463.    Specification of Letters Patent.    Patented Oct. 27, 1908.

Application filed February 8, 1907. Serial No. 356,346.

*To all whom it may concern:*

Be it known that I, FRANK ARMSTRONG, of Dunedin, New Zealand, have invented certain new and useful Improvements in Dental Apparatus, of which the following is a specification.

My invention relates to an apparatus for use during the operation of filling teeth.

According to my invention the tooth is kept constantly moist and at the temperature of the blood of the patient and the moistening agent may contain a lubricator with or without an anesthetic so that there is no pain felt by the patient.

The invention consists broadly in apparatus for keeping the moistening agent constantly at blood temperature means for supplying same to the tooth and a specially formed dam for draining same away outside of the patient's mouth, as hereinafter illustrated and described and more particularly pointed out in the claims.

In the drawings accompanying this specification the same numerals of reference indicate the same or similar parts.

Figure 1 is a perspective view of the apparatus for keeping the moistening agent at a constant temperature and supplying it to the tooth. Fig. 2 is a cross sectional end view of the boiler of same. Fig. 3 is a front perspective view of the dam frame placed on a sheet of rubber. Fig. 4 is a cross sectional detail view showing connection of the two arms of the frame. Fig. 5 is a front perspective view of the completed dam.

The apparatus comprises a suitable stand (1) at the upper end of which are four metal brackets (2) (3) (4) (5) which support a boiler (6) having an inlet (7) provided with a valve (8) and an outlet (9) to which is attached a flexible tube (10) fitted with a dental nozzle (11). Four vertical standards (12) (13) (14) (15) are secured above the boiler (6) one to each of the four corners thereof, and are connected at the top by a metal crosspiece (16). At the head of each of the standards, and on the metal crosspiece (16) are mounted four grooved pulleys (17) (18) (19) (20) over which pass pieces of flexible wire (21) the ends of which are reeved through holes (22) in the metal crosspiece (16) and support the drug receivers (23). The other ends of the wires (21) are formed with a series of loops (24) adapted to engage hooks (25) attached to the standards (12) (13) (14) (15) so as to support the drug receivers (25) in any desired height. To the lower ends of the receivers (23) are attached flexible tubes (26) of sufficient length to permit connection with the inlet (7) of the boiler (6), the receivers being provided with taps (58) for controlling the supply. The boiler (6) is provided with a funnel (27) for the purpose of filling it, and with a water-gage glass (28) to indicate the water level. On the stand (1) below the boiler (6) is a suitable gas burner (29) supplied with gas by means of a flexible tube (30) connecting a gas main, with the hollow interior of the stand (1) up which the gas passes to the burner. A flexible pipe (31) is attached to a stand pipe (32) fitted with a valve (33) to provide a supply of water from a water main, the flexible pipe (31) being adapted to connect with the inlet (7). Between the inlet (7) and outlet (9) of the boiler a tube (34) extends, as shown in Fig. 2.

The rubber dam for draining the liquid away and keeping it out of the patient's mouth is illustrated in Figs. 3, 4, and 5. The wire frame for the dam comprises two cupped disks (35) (36) with central holes therein the upper disk (35) having a short externally threaded tube (37) (see Fig. 4) integral with it and extending below it. The disk (36) fits round the tube (37) under the disk (35). Attached to one side of the disk (35) (see Fig. 3) are a pair of upwardly extending wire arms (38) (39) provided about midway with a strengthening piece (40) and a projecting piece (41) and joined near their top ends, the wire (38) having a bent end (42). A similar pair of wire arms (43) (44) extend upwards from the disk (36) on the opposite side to the arms (38) (39). From the disk (35) opposite the wires (38) (39) a wire arm (45) extends outwardly and upwardly, this arm (45) having a center extension (46) projecting inwardly. A similar wire (47) with extension (48) extends from the disk (36). The wires (46) (48) have curved ends (59) (60) which cross each other. An internally threaded nipple (49) (see Fig. 4) screws onto the tubular extension (37) of the disk (35) and it will be seen that on loosening the nipple (49) the disks (35 (36) are loosened so that they may be partly revolved to increase or diminish the distance between the pair of wires (38) (39) and the pair (43) (44) so as to adjust the frame to the size of the face of a patient. On tightening up the nipple (49) the disks (35) (36) are clamped together. To form the dam, the frame is adjusted to the width required, and a suitably sized sheet of rubber (50) is taken and perforated near one end so that the end of the nipple (49) may be passed through the perforation and the frame laid on the sheet as shown in Fig. 3. The top end of the sheet is then drawn outwardly and the top corners (51) made to catch on the wire points (42). The sides (52) of the sheet (50) are also drawn out and made to catch on the wire points (41) and (47). The right hand lower corner (54) of the sheet is then folded over and drawn tight and made to catch on the end of the wire (46) and the left hand lower corner (53) similarly made to catch on the end of the wire (48). The lower edge (55) of the sheet with the slack is then gathered together drawn tight and turned over and made to catch on the curved ends (59) (60) of the wires (46) (48), the result being the completion of the dam as indicated in Fig. 5. A flexible tube (56) is attached to the nipple (49) and connected with a waste pipe.

The operation of the apparatus is as follows: The dam having been formed as above described it is attached to the head of the patient by the ordinary well known strap and catches. The back of the rubber sheet (50) previously perforated at the suitable position according to the tooth to be filled, is stretched back and the tooth brought through the perforation in the usual manner, the rubber being secured on it by a clamp, thread, or other well known means, the tooth thus projecting through the back wall of the rubber sheet. Water having been poured into the boiler (6) of the spraying apparatus and the receivers (23) having been filled with the desired drugs or liquids respectively, the gas burner (29) is lighted to heat the water in the boiler so as to keep it at boiling point. The flexible tube (26) from the particular receiver (23) containing the drug it is desired to use is then connected to the inlet (7) and the valve (8) opened to allow the liquid to pass through the tube (34) in the boiler out through the outlet (9) and thence to the nozzle (10) by which the tooth is sprayed during or before the operation of drilling, the liquid running out of the dam through the outlet (57) down the tube (56). The velocity of the flow of a drug from a receiver (23) is controlled by adjusting the height of the receiver relatively to the inlet (7). The temperature of the drug is controlled by thus controlling its velocity through the tube 10 which controls the time the drug is subjected to the heat applied to the tube (10) by the boiling water in the boiler (6).

Having now described my invention, what I claim as new and desire to secure by Letters Patent is:—

1. Dental apparatus comprising a receiver for a drug solution, means for heating said solution, means for controlling the heat of said solution, means for spraying same on the tooth of a patient, and means for preventing same entering the mouth of a patient, and means for draining same away substantially as described.

2. A dental apparatus comprising a water boiling apparatus, a drug receiver suspended at a regulable distance above said apparatus, a dental spraying nozzle, and a tube leading from said drug receiver through said water boiler to said nozzle substantially as described.

3. Dental apparatus comprising a water boiling apparatus, a stand above said water boiling apparatus, a drug receiver suspended from said stand at a regulable distance, a dental spraying nozzle, and a tube leading from said receiver through said water boiler to said nozzle substantially as described.

4. Dental apparatus comprising a receiver for a drug solution means for heating said solution, means for spraying same on the tooth of a patient and means for draining the solution away from the tooth substantially as described.

5. Dental apparatus comprising a water boiling apparatus, a drug receiver suspended at a regulable distance above said apparatus, a dental spraying nozzle, and a tube leading from said drug receiver through said water boiler to said nozzle, and means for draining the solution away from the tooth substantially as described.

6. Dental apparatus comprising a water boiling apparatus a stand above said water boiling apparatus a drug receiver suspended from said stand at a regulable distance, a dental spraying nozzle and a tube leading from said drug receiver through said boiling apparatus to said nozzle and means for draining the solution away from the tooth substantially as described.

7. Dental apparatus comprising a heating apparatus, a drug receiver suspended at a regulable distance above said heating apparatus, a dental spraying nozzle, and a tube leading from said drug receiver through said heating apparatus to said nozzle substantially as described.

8. Dental apparatus comprising a heating apparatus a stand above said heating apparatus a drug receiver suspended from said stand at a regulable distance, a dental spraying nozzle and a tube leading from said drug receiver through said heating apparatus to said nozzle substantially as described.

9. Dental apparatus comprising a heating apparatus, a drug receiver suspended at a regulable distance above said apparatus, a dental spraying nozzle and a tube leading from said drug receiver through said heating apparatus to said nozzle and means for draining the solution away from the tooth substantially as described.

10. Dental apparatus comprising a heating apparatus a stand above said heating apparatus a drug receiver suspended from said stand at a regulable distance, a dental spraying nozzle and a tube leading from said drug receiver through said heating apparatus to said nozzle and means for draining the solution away from the tooth substantially as described.

In testimony whereof I have signed my name to this specification in the presence of two subscribing witnesses.

FRANK ARMSTRONG.

Witnesses:
ANDREW JOHN PARK,
JOHN RUTHERFORD PARK.